United States Patent
Jung et al.

(10) Patent No.: US 9,513,515 B2
(45) Date of Patent: Dec. 6, 2016

(54) LIQUID CRYSTAL DISPLAY HAVING IMPROVED RESPONSE SPEED

(71) Applicant: Samsung Display Co., Ltd., Yongin, Gyeonggi-Do (KR)

(72) Inventors: Jae Hoon Jung, Anyang-si (KR); Ki Chul Shin, Seongnam-si (KR); Min Ju Han, Seoul (KR); Ji Phyo Hong, Pyeongtaek-si (KR); Su Jeong Kim, Seoul (KR); Hoon Kim, Ansan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 107 days.

(21) Appl. No.: 14/198,294

(22) Filed: Mar. 5, 2014

(65) Prior Publication Data

US 2015/0070634 A1 Mar. 12, 2015

(30) Foreign Application Priority Data

Sep. 9, 2013 (KR) .................. 10-2013-0108004

(51) Int. Cl.
  *G02F 1/1343* (2006.01)
  *G02F 1/1337* (2006.01)
  *G02F 1/1362* (2006.01)

(52) U.S. Cl.
  CPC ... *G02F 1/134363* (2013.01); *G02F 1/133707* (2013.01); *G02F 2001/134381* (2013.01); *G02F 2001/136222* (2013.01)

(58) Field of Classification Search
  CPC ............... G02F 1/134363; G02F 1/133707; G02F 2001/134381; G02F 2001/136222
  (Continued)

(56) References Cited

U.S. PATENT DOCUMENTS 6,856,367 B2   2/2005   Yoo et al.
7,139,051 B2  11/2006   Park et al.
(Continued)

FOREIGN PATENT DOCUMENTS

JP    09-185080    7/1997
JP    3608755     10/2004
(Continued)

OTHER PUBLICATIONS

Shin et al.; "Vertical alignment nematic liquid crystal cell controlled by double-side in-plane switching with positive dielectric anisotropy liquid crystal"; Journal of Applied Physics 104, 084515 (2008).

(Continued)

*Primary Examiner* — Charles Chang
(74) *Attorney, Agent, or Firm* — Innovation Counsel LLP

(57) ABSTRACT

A liquid crystal display includes: a first electrode and a second electrode disposed on a first substrate, the first electrode and the second electrode being disposed at a same layer; a second substrate facing the first substrate; a third electrode and a fourth electrode disposed on the second substrate and disposed at different layers; and a liquid crystal layer including liquid crystal molecules disposed between the first substrate and the second substrate, wherein the first electrode, the second electrode, and the third electrode each include a plurality of branch electrodes, but the fourth electrode does not; and wherein the first electrode is electrically connected to the third electrode.

20 Claims, 8 Drawing Sheets

(58) Field of Classification Search
USPC .......................................................... 349/141
See application file for complete search history.

(56) References Cited

U.S. PATENT DOCUMENTS

| | | | |
|---|---|---|---|
| 7,369,204 B1 | 5/2008 | Choi et al. | |
| 7,929,097 B1 | 4/2011 | Choi et al. | |
| 8,179,485 B2 | 5/2012 | Tsai et al. | |
| 8,208,080 B2 | 6/2012 | Zhu et al. | |
| 2008/0129901 A1* | 6/2008 | You | G02F 1/13718 349/33 |
| 2011/0273638 A1* | 11/2011 | Tsai | G02F 1/137 349/33 |
| 2012/0133878 A1* | 5/2012 | Hirakata | G02F 1/133528 349/141 |

FOREIGN PATENT DOCUMENTS

| | | |
|---|---|---|
| KR | 10-0272536 B1 | 8/2000 |
| KR | 10-0507275 | 8/2005 |
| KR | 10-0705621 | 4/2007 |
| KR | 10-0875188 | 12/2008 |
| KR | 10-0934566 | 12/2009 |

OTHER PUBLICATIONS

Jiao et al.; "Submillisecond response nematic liquid crystal modulators using dual fringe field switching in a vertically aligned cell"; Applied Physics Letters 92, 111101 (2008).
Xu et al.; "Nematic Liquid Crystal Display with Submillisecond Grayscale Response Time"; Display Technology Letters; Journal of Display Technology, vol. 9, No. 2 (2013).

* cited by examiner

LIQUID CRYSTAL DISPLAY HAVING IMPROVED RESPONSE SPEED

CROSS-REFERENCE TO RELATED APPLICATION

This application claims priority to, and the benefit of, Korean Patent Application No. 10-2013-0108004 filed in the Korean Intellectual Property Office on Sep. 9, 2013, the entire contents of which are incorporated herein by reference.

BACKGROUND (a) Field

Embodiments of the present invention relate generally to flat panel displays. More specifically, embodiments of the present invention relate to a liquid crystal display having improved response speed.

(b) Description of the Related Art

A liquid crystal display, which is currently perhaps the most widely used flat panel display at present, includes two display panels on which electric field generating electrodes such as a pixel electrode and a common electrode are formed, and a liquid crystal layer inserted therebetween.

The liquid crystal display displays an image by generating an electric field on a liquid crystal layer. A voltage is applied across the electric field generating electrodes, thus generating an electric field therebetween and determining alignments of liquid crystal molecules of the liquid crystal layer through the generated electric field, thereby controlling polarization of incident light.

The liquid crystal display further includes switching elements connected to each of the pixel electrodes, and a plurality of signal lines, such as gate lines and data lines, which control the switching elements to apply a voltage to the pixel electrodes.

In a vertically aligned mode liquid crystal display, long axes of liquid crystal molecules are arranged to be perpendicular to upper and lower display panels when no electric field is applied. A liquid crystal display with a vertically aligned mode is often desirable for its high contrast ratio and wide reference viewing angle.

In particular, a lower display panel of the liquid crystal display in the vertically aligned mode is provided with an electrode having a minute slit structure, and an upper display panel thereof is provided with an electrode having a plate shape to be able to apply a voltage to each of the electrodes. However, as the width of the minute slits is designed to be small, distortion of the electric field is increased such that the liquid crystal molecules are oriented differently in different areas, thereby generating a deterioration of transmittance and a deterioration of response time.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a liquid crystal display having improved response speed.

An exemplary embodiment of the present invention provides a liquid crystal display including: a first electrode and a second electrode disposed on a first substrate, the first electrode and the second electrode being disposed at a same layer; a second substrate facing the first substrate; a third electrode and a fourth electrode disposed on the second substrate and disposed at different layers; and a liquid crystal layer including liquid crystal molecules disposed between the first substrate and the second substrate. The first electrode, the second electrode, and the third electrode each include a plurality of branch electrodes, but the fourth electrode does not. The first electrode is electrically connected to the third electrode.

The liquid crystal display further includes a storage electrode line disposed on the first substrate and an insulating layer disposed on the storage electrode line, wherein the storage electrode line is connected to the second electrode through a contact hole formed in the insulating layer.

The liquid crystal display further includes: a gate line disposed on the first substrate and including a gate electrode; a data line crossing the gate line and connected to a source electrode; and a drain electrode facing the source electrode, wherein the first electrode is connected to the drain electrode.

A first branch electrode of the first electrode and a second branch electrode of the second electrode are arranged in alternating manner.

The liquid crystal display further includes an organic layer disposed on the data line, wherein the organic layer has a protrusion at a position that corresponds to the data line.

The organic layer includes a color filter layer that includes a first color filter adjacent to a second color filter, and the first color filter and the second color filter overlap each other in a region that corresponds to the data line so as to form the protrusion.

The first electrode includes a first connector for connecting the first branch electrode, the third electrode includes a third connector for connecting a third branch electrode, and the first connector and the third connector overlap each other.

The first connector and the third connector contact each other on the protrusion.

The liquid crystal display further includes a light blocking member disposed on the second substrate, wherein the light blocking member is positioned to correspond to the protrusion.

A sum of a height of the light blocking member and a height of the protrusion is greater than or equal to a cell gap of the liquid crystal layer.

The second electrode includes a second connector for connecting the second branch electrode, and the second connector is connected to the storage electrode line.

Branch electrodes of the first electrode and the second electrode are positioned symmetrically with respect to branch electrodes of the third electrode.

Branch electrodes of the first electrode and the second electrode are positioned in alternating manner with branch electrodes of the third electrode.

The liquid crystal display further includes an insulating layer disposed between the third electrode and the fourth electrode.

An in-plane field is generated between the first electrode and the second electrode when a voltage is applied across the first electrode and the second electrode, and a fringe field is generated between the third electrode and the fourth electrode when a voltage is applied across the third electrode and the fourth electrode.

The fourth electrode is configured to receive a common voltage.

The second electrode is configured to receive a same voltage as that received by the fourth electrode.

The liquid crystal molecules have positive dielectric anisotropy.

The liquid crystal molecules are perpendicularly aligned with either the first substrate or the second substrate while no electric field is applied to the liquid crystal layer.

The first electrode contacts the third electrode.

The first electrode may be disposed at a same layer as the second electrode.

According to an embodiment of the present invention, the liquid crystal response speed is improved by applying a voltage to the display plate of the upper panel and the lower panel and respectively forming a field at the top and bottom of the liquid crystal layer.

DETAILED DESCRIPTION OF THE EMBODIMENTS

Figure 1:
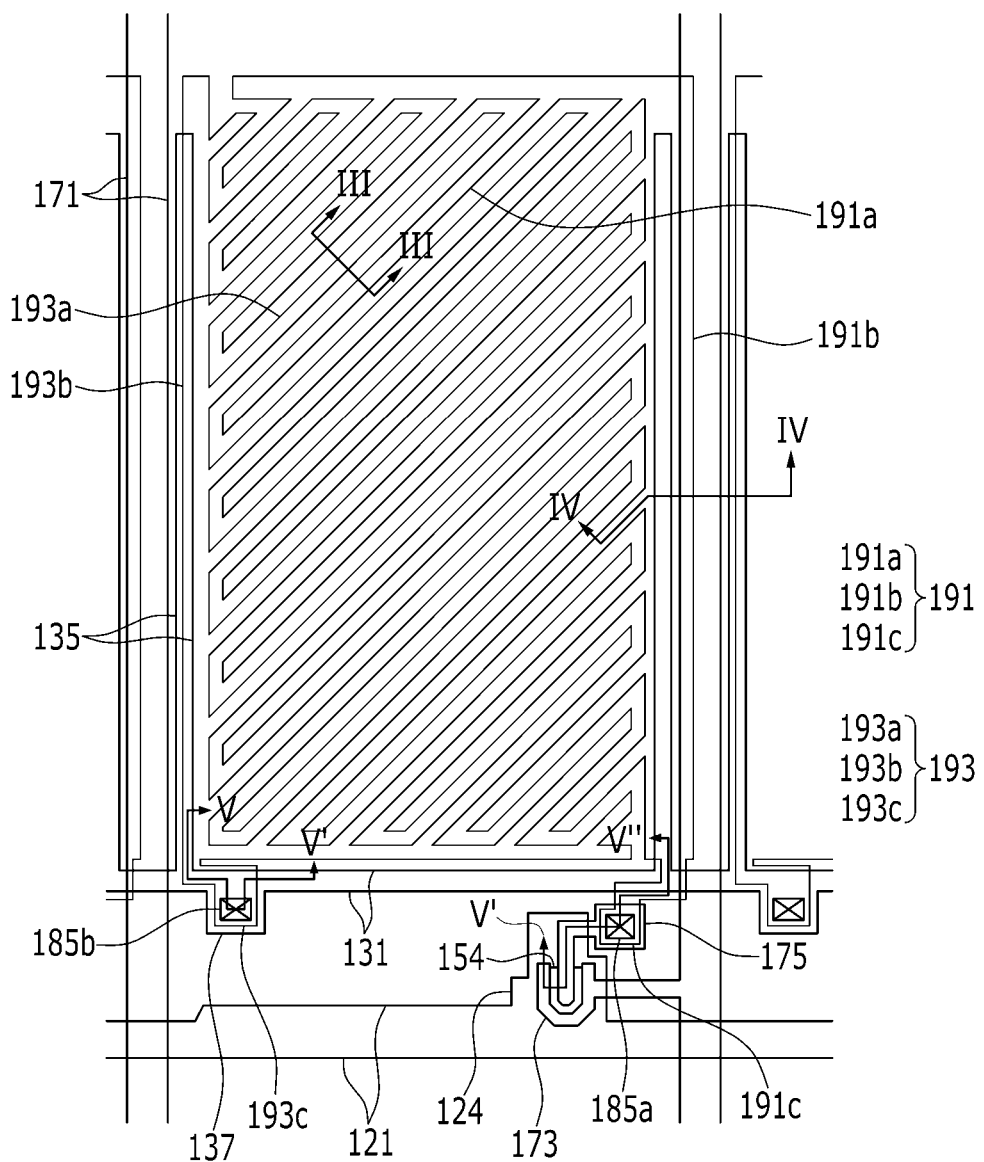
FIG. 1 shows a top plan view of a lower panel of a liquid crystal display according to an exemplary embodiment of the present invention.

Exemplary embodiments of the present invention will be described in detail with reference to the accompanying drawings. However, the present invention is not limited to exemplary embodiments described herein, but may be embodied in other forms. Rather, exemplary embodiments described herein are provided to thoroughly and completely understand the disclosed contents and to sufficiently transfer the ideas of the present invention to a person of ordinary skill in the art.

In the drawings, the thickness of layers and regions is exaggerated for clarity. It is to be noted that when a layer is referred to as being "on" another layer or substrate, it can be directly formed on another layer or substrate or can be formed on another layer or substrate through a third layer interposed therebetween. Like constituent elements are denoted by like reference numerals denotes throughout the specification. The various figures are not to scale.

Figure 2:
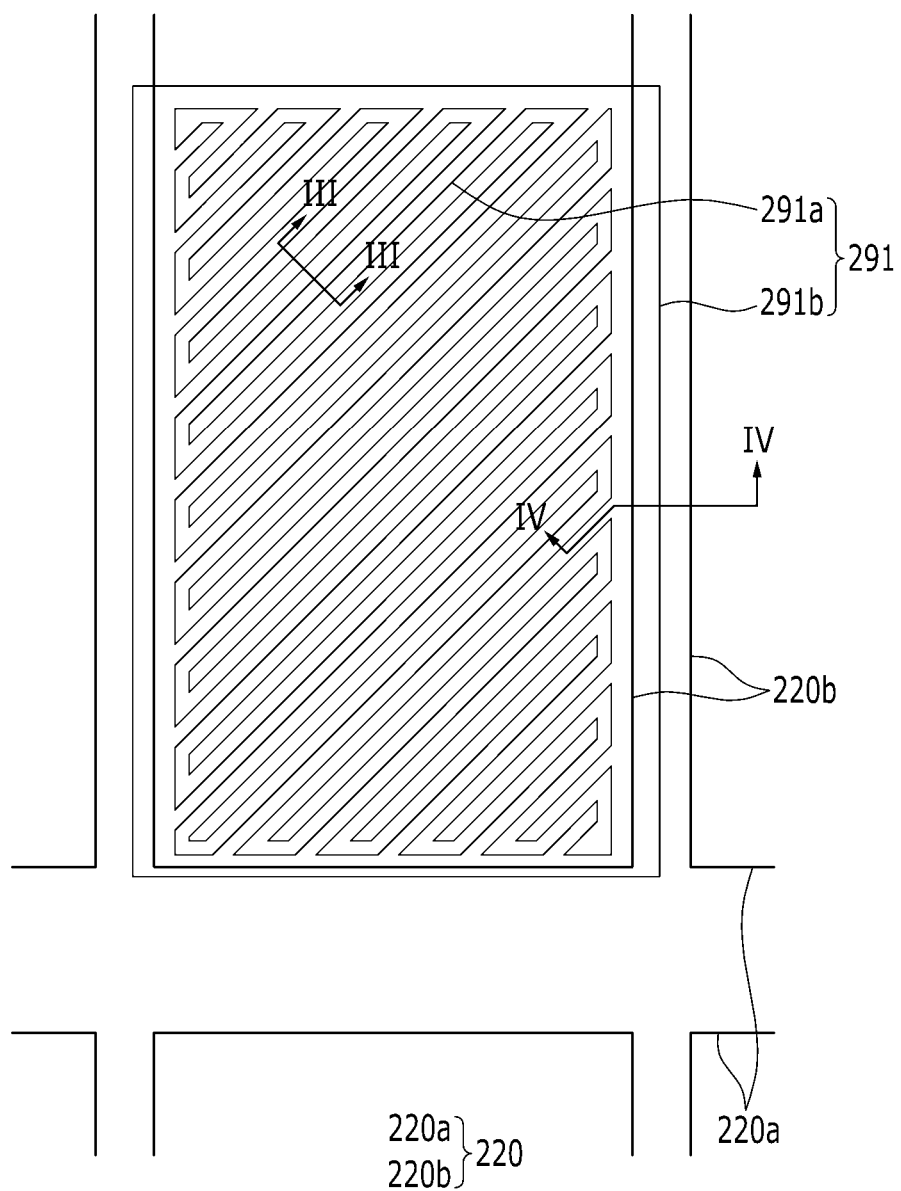
FIG. 2 shows a top plan view of an upper panel of a liquid crystal display according to an exemplary embodiment of the present invention.
Figure 3:
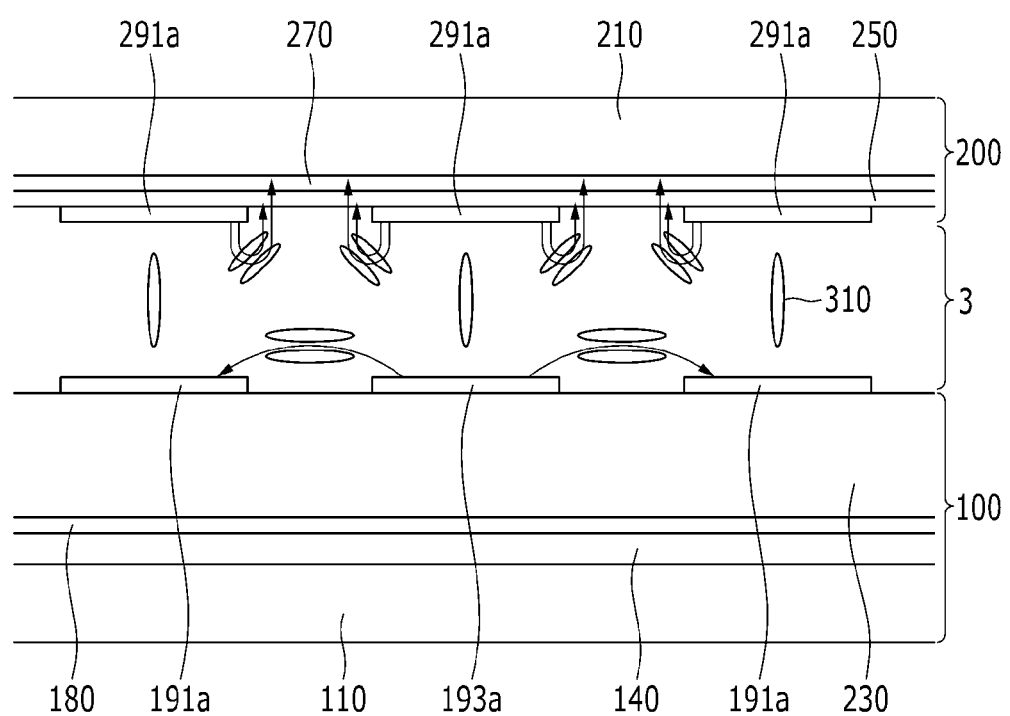
FIG. 3 shows a cross-sectional view with respect to a line of FIG. 1 and FIG. 2.
Figure 4:
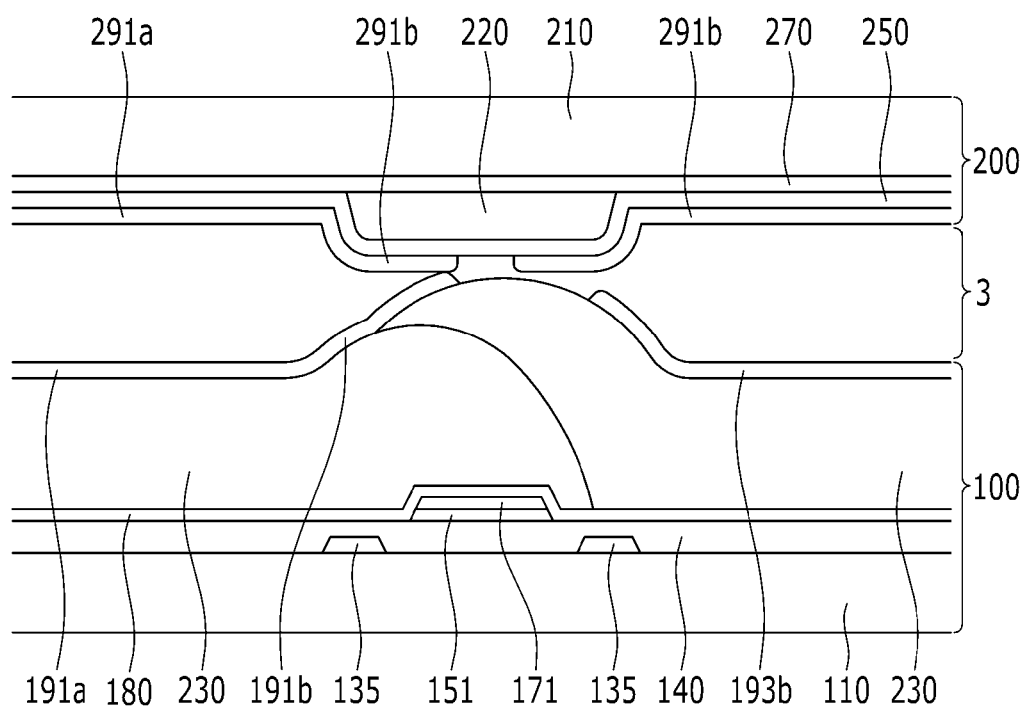
FIG. 4 shows a cross-sectional view with respect to a line IV-IV of FIG. 1 and FIG. 2.
Figure 5:
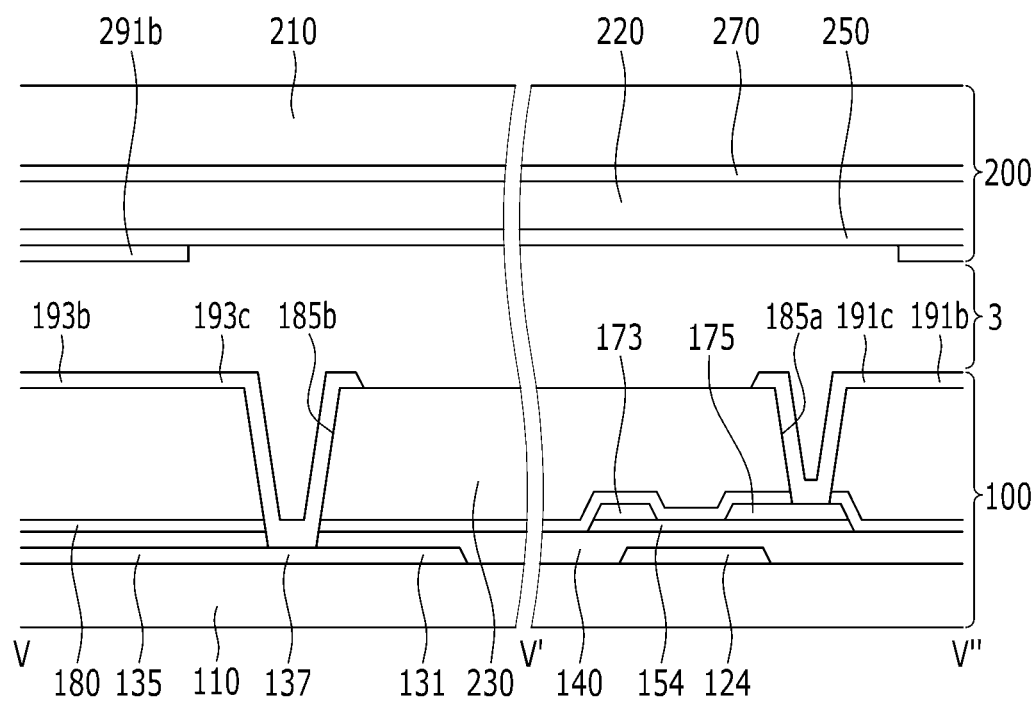
FIG. 5 shows a cross-sectional view with respect to a line V-V' and a line V'-V'' of FIG. 1.

FIG. 1 shows a top plan view of a lower panel of a liquid crystal display according to an exemplary embodiment of the present invention. FIG. 2 shows a top plan view of an upper panel of a liquid crystal display according to an exemplary embodiment of the present invention. FIG. 3 shows a cross-sectional view with respect to a line of FIG. 1 and FIG. 2. FIG. 4 shows a cross-sectional view with respect to a line IV-IV of FIG. 1 and FIG. 2. FIG. 5 shows a cross-sectional view with respect to a line V-V' and a line V'-V'' of FIG. 1.

A lower panel 100 will now be described.

Referring to FIG. 1, and FIG. 3 to FIG. 5, a gate line 121 and a storage electrode line 131 are disposed on an insulation substrate 110 made of transparent glass or plastic in the lower panel 100. The gate line 121 includes a gate electrode 124. The storage electrode line 131 primarily extends in a horizontal direction and transmits a predetermined voltage such as a common voltage (Vcom). The storage electrode line 131 includes a pair of vertical units 135 substantially extending perpendicular to the gate line 121a, and a storage electrode 137 extending below the storage electrode line 131 in the view of FIG. 1. The vertical units 135 of the storage electrode line 131 at least partially overlap a first electrode 191 and a second electrode 193.

A gate insulating layer 140 is formed on the gate line 121 and the storage electrode line 131. A semiconductor layer 151 positioned under the data line 171, and a semiconductor layer 154 positioned under a source/drain electrode and at a channel portion of a thin film transistor, are formed on the gate insulating layer 140.

A plurality of ohmic contacts (not shown) may be formed on the respective semiconductor layers 151 and 154, and between the data line 171 and the source/drain electrodes 173/175.

Data conductors including a source electrode 173, a data line 171 connected with the source electrode 173, and a drain electrode 175 are formed on the semiconductor layer 154 and the gate insulating layer 140.

The gate electrode 124, the source electrode 173, and the drain electrode 175 form a thin film transistor together with the semiconductor layer 154, and a channel of the thin film transistor is formed in a portion of the semiconductor layer 154 between the source electrode 173 and the drain electrode 175.

An interlayer insulating layer 180 is formed on the data conductors 171, 173, and 175 and on an exposed portion of the semiconductor layer 154. The interlayer insulating layer 180 may include an inorganic insulating material, such as a silicon nitride (SiNx) and a silicon oxide (SiOx), or an organic insulating material.

An organic layer 230 is disposed on the interlayer insulating layer 180. The organic layer 230 can be a color filter. The color filter 230 can display one of three primary colors including red, green, and blue. However, the colors are not limited to red, green, and blue, and the color filter 230 may also display one among a cyan-based color, a magenta-based color, a yellow-based color, and a white-based color. Indeed, the color filter 230 may be configured to display any desired color.

The color filter 230 may be formed of a material displaying different colors on each adjacent pixel.

The color filter 230 has a major axis extending along the vertical direction, and differently-colored color filters can be arranged alongside each other in the horizontal direction. In this instance, color filters 230 that neighbor each other in the horizontal direction and express different colors also overlap each other. As the neighboring color filters 230 overlap, a step or protrusion is formed at a part that corresponds to the data line 171.

Although not shown, a passivation layer for covering the color filter 230 can be disposed on the color filter 230.

The passivation layer includes an inorganic insulator or an organic insulator such as a silicon nitride (SiNx) or a silicon oxide (SiOx).

The first electrode 191 and the second electrode 193 are disposed on the color filter 230. The first electrode 191 and the second electrode 193 can be made of a transparent conductive material such as ITO or IZO. As shown in FIG. 5, a first contact hole 185a exposing the drain electrode 175 is formed through the color filter 230 and the interlayer insulating layer 180, and a second contact hole 185b exposing a storage electrode 137 is formed through the color filter 230, the interlayer insulating layer 180, and the gate insulating layer 140.

The first electrode 191 and the second electrode 193 together have an at least approximately quadrangular shape when viewed in plan view as in FIG. 1, and the first electrode 191 and the second electrode 193 include a plurality of branch electrodes 191a and 193a extended in an oblique direction. The first electrode 191 includes the first branch electrodes 191a extended in a lower left direction, a first connector 191b for connecting the first branch electrodes 191a to each other, and a lower protrusion 191c extended from the first connector 191b. The second electrode 193 includes the second branch electrodes 193a extended in an upper right direction, a second connector 193b for connecting the second branch electrodes 193a to each other, and a lower protrusion 193c extended from the second connector 193b.

As shown in FIG. 5, the first electrode 191 is connected to the drain electrode 175 through the first contact hole 185a. The second electrode 193 is connected to the storage electrode 137 through the second contact hole 185b. Therefore, the first electrode 191 receives a data voltage from the drain electrode 175, and the second electrode 193 receives a constant voltage such as a common voltage from the storage electrode line 131.

The first electrode 191 and the second electrode 193 are disposed on a same layer, and the first branch electrode 191a and the second branch electrode 193a can be arranged in alternating manner. Therefore, when the data voltage is applied to the first electrode 191 and a constant voltage such as the common voltage is applied to the second electrode 193, the lower panel 100 generates an electric field (an in-plane field) in the horizontal direction to align liquid crystal molecules 310 as shown in FIG. 3. The liquid crystal molecules 310 can have positive dielectric anisotropy.

An upper panel 200 will now be described.

A common electrode 270 is disposed on a second substrate 210 of the upper panel 200. The common electrode 270 has a planar shape, i.e. is substantially flat. The planar shape represents a plate shape that is not broken. The common electrode 270 will be referred to as a fourth electrode 270 hereinafter. The common voltage is applied to the fourth electrode 270.

A light blocking member 220 is disposed on the fourth electrode 270. The light blocking member 220 is also called a black matrix and blocks light leakage between neighboring pixels disposed on the lower panel 100. The light blocking member 220 has a plurality of openings (not shown) that correspond to pixel areas. The light blocking member 220 can be disposed at a part that corresponds to the gate line 121 and the data line 171, and at a part that corresponds to a thin film transistor. As shown in FIG. 4, the light blocking member 220 can form a step or protrusion corresponding to an area of overlap between two adjacent color filters 230, so that the first connector 191b may contact a third connector 291b.

An insulating layer 250 is disposed on the fourth electrode 270 and the light blocking member 220. The insulating layer 250 can include an inorganic insulator or an organic insulator such as a silicon nitride (SiNx) and/or a silicon oxide (SiOx).

A third electrode 291 is disposed on the insulating layer 250. The third electrode 291 has an at least approximately quadrangular shape when viewed in plan view, and includes a third branch electrode 291a extended in the oblique direction and the third connector 291b for connecting the third branch electrodes 291a to each other. The third branch electrode 291a is extended in the same direction (i.e. is oriented at the same angle) as the first branch electrode 191a and the second branch electrode 193a disposed on the lower panel 100. The third connector 291b has four stems that act to connect the third branch electrodes 291a to each other, and includes two horizontal stems and two perpendicular stems.

As shown in FIG. 2, the third connector 291b, shown as the rightmost of the two perpendicular stems, overlaps the first connector 191b disposed on the lower panel 100. As shown in FIG. 4, the first connector 191b and the third connector 291b contact each other at the step or protrusion caused by overlapping adjacent color filters 230. Further, the light blocking member 220 is disposed over the step generated by the overlapping color filters 230. The data voltage is transmitted to the third connector 291b through the first connector 191b, so that the third electrode 291 receives the same voltage as the first electrode 191.

As described, the linear third electrode 291 and the planar fourth electrode 270 (that is, the fourth electrode 270 does not have any branches extending therefrom, but is instead a single body structure without branchlike extensions) are formed with the insulating layer 250 therebetween on the upper panel 200, and when the voltage is applied, a fringe field is generated on the upper panel 200 as shown in FIG. 3 to align the liquid crystal molecules 310. The liquid crystal molecules 310 can have positive dielectric anisotropy.

As described, the liquid crystal molecules 310 are aligned by respectively forming electric fields on the lower panel 100 and the upper panel 200, thereby increasing dielectric torque. Therefore, response speed can be improved.

Alignment layers (not shown) are respectively disposed on inner sides of the display panels 100 and 200, and they can be vertical alignment layers. The liquid crystal display includes a liquid crystal layer 3 including the liquid crystal molecules 310 between the lower panel 100 and the upper panel 200, as well as a pair of polarizers (not shown) attached to external sides of the display panels 100 and 200. The liquid crystal molecules 310 can be perpendicularly aligned with respect to the first substrate 110 or the second substrate 210 while no electric field is applied to the liquid crystal layer 3.

Figure 6:
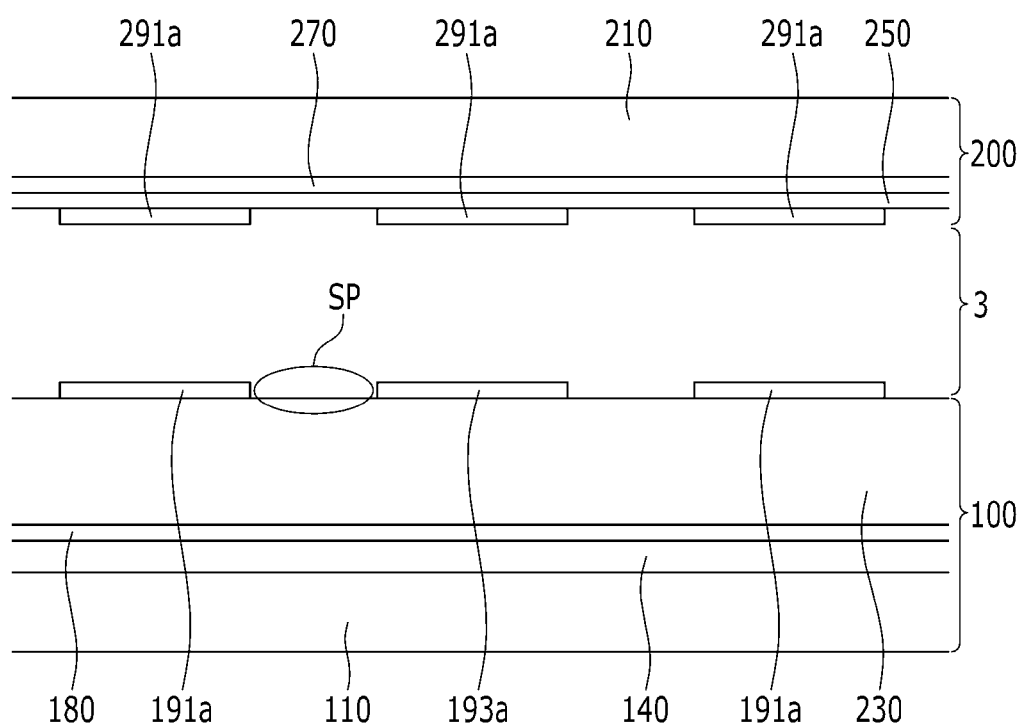
FIG. 6 shows a cross-sectional view of a branch electrode having a symmetric structure in a liquid crystal display according to an exemplary embodiment of the present invention.

FIG. 6 shows a cross-sectional view of a branch electrode having a symmetric structure in a liquid crystal display according to an exemplary embodiment of the present invention.

Referring to FIG. 6, the first branch electrodes 191a and the second branch electrodes 191b of the second electrode 193 on the lower panel 100 are symmetric to the third branch electrodes 291a of the third electrode 291 on the upper panel 200. That is, the third branch electrodes 291a overlap the first and second branch electrodes 191a, b in plan view.

Figure 7:
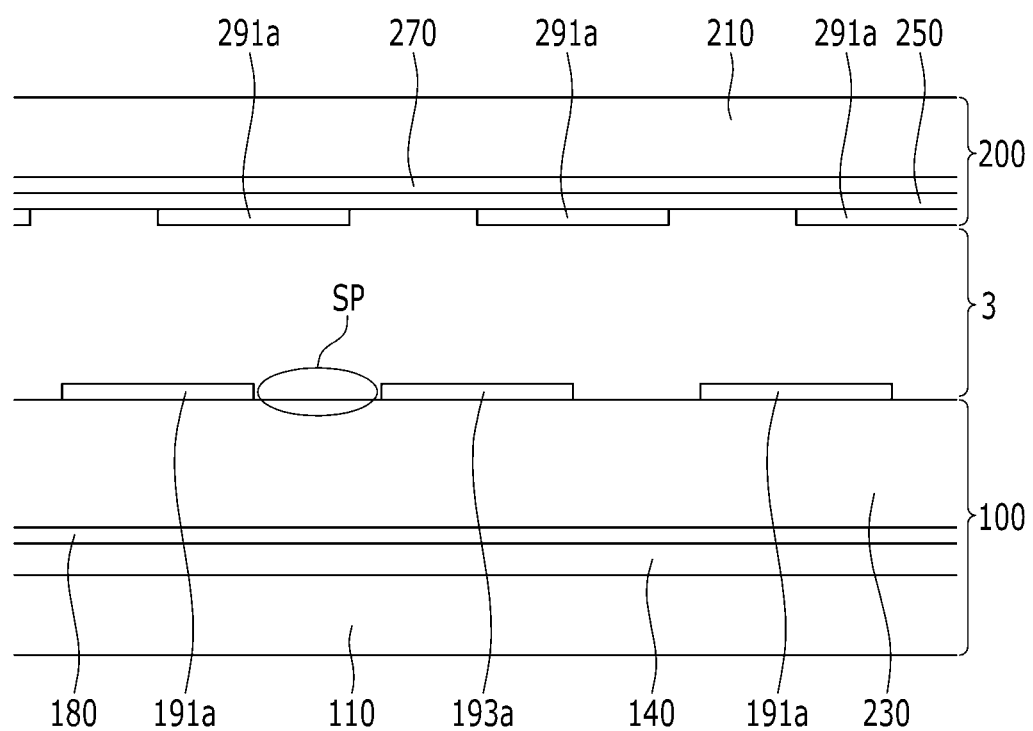
FIG. 7 and FIG. 8 show cross-sectional views of a branch electrode having an asymmetric structure in a liquid crystal display according to an exemplary embodiment of the present invention.
Figure 8:
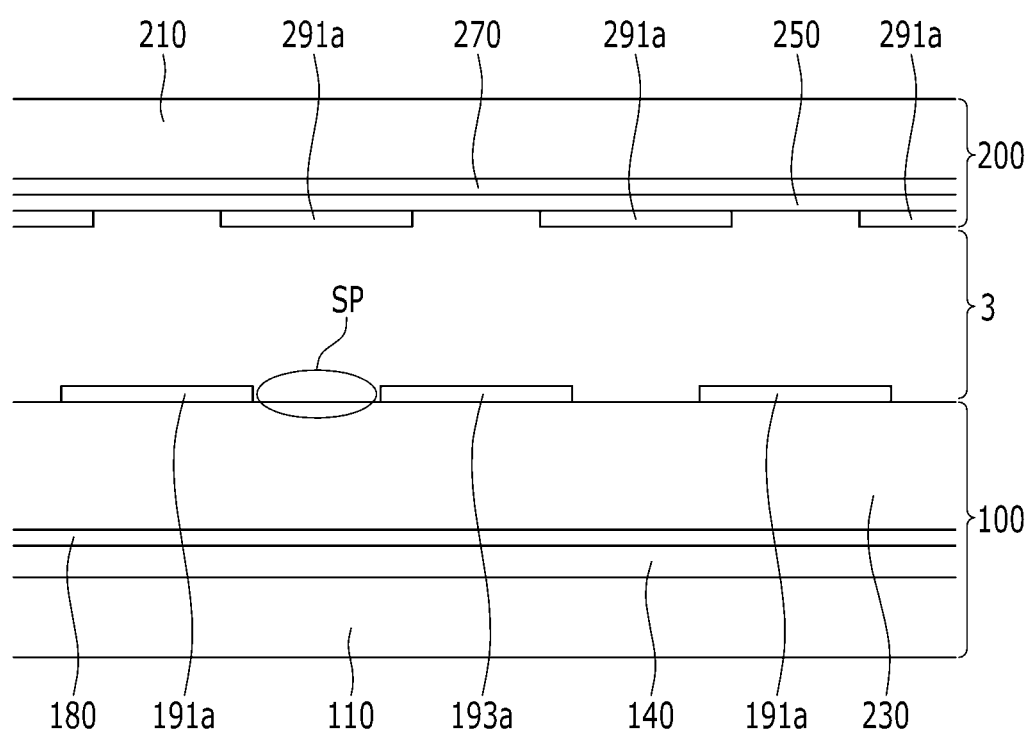

FIG. 7 and FIG. 8 show cross-sectional views of a branch electrode having an asymmetric structure in a liquid crystal display according to an exemplary embodiment of the present invention.

Referring to FIG. 7, the amount of overlap between the third branch electrode 291a and either the first branch electrode 191a or the second branch electrode 193a is half the width of the first branch electrode 191a, the second branch electrode 193a, or the third branch electrode 291a.

Referring to FIG. 8, the amount of overlap between the third branch electrode 291a and either the first branch electrode 191a or the second branch electrode 193a is very much less than that of the exemplary embodiment described with reference to FIG. 7, and the center of the third branch electrode 291a substantially corresponds to a center of a spacer (SP) between the first branch electrode 191a and the second branch electrode 193a.

When there are an exemplary embodiment A, an exemplary embodiment B, and an exemplary embodiment C with respective electrodes positioned as in FIG. 6, FIG. 7, and FIG. 8, 8.5 volts and 15.0 volts are applied to measure transmittance in the respective exemplary embodiments. When the transmittance measured in the exemplary embodiment A is set to be 100% as a reference and the transmittance of the exemplary embodiment B and the exemplary embodiment C are measured, the transmittance is measured as 96.9% and 125% in the case of the applied voltage of 8.5 volts, and the transmittance is measured as 96.6% and 130% in the case of the applied voltage of 15.0 volts. Accordingly, it is desirable to dispose the electrodes that are formed on the lower panel 100 and the upper panel 200 and face each other to be totally asymmetrical with each other from the viewpoint of transmittance. In other words, it is desirable to dispose the electrodes such that the center of the branch electrode disposed on the upper panel 200 corresponds to the center of the spacer (SP) between the neighboring branch electrodes disposed on the lower panel 100.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Additionally, various features of the above described embodiments may be mixed and matched in any combinations so as to produce further embodiments.

What is claimed is:

1. A liquid crystal display comprising:
   a first substrate;
   a first electrode and a second electrode disposed on the first substrate, the first electrode and the second electrode being disposed at a same layer;
   a second substrate facing the first substrate;
   a third electrode and a fourth electrode disposed on the second substrate, the third electrode and the fourth electrode being disposed on different layers; and
   a liquid crystal layer disposed between the first substrate and the second substrate and including liquid crystal molecules,
   wherein the first electrode, the second electrode, and the third electrode each include a plurality of branch electrodes, but the fourth electrode does not, and
   wherein the first electrode is electrically connected to the third electrode, and
   wherein the first, second, third, and fourth electrodes are configured to generate electric fields, a direction of the electric field generated between the first electrode and the second electrode being different from a direction of the electric field generated between the third electrode and the fourth electrode.

2. The liquid crystal display of claim 1, further including:
   a storage electrode line disposed on the first substrate; and
   an insulating layer disposed on the storage electrode line, wherein the storage electrode line is connected to the second electrode through a contact hole formed in the insulating layer.

3. The liquid crystal display of claim 2, further including:
   a gate line disposed on the first substrate and including a gate electrode;
   a data line crossing the gate line and connected to a source electrode; and
   a drain electrode facing the source electrode,
   wherein the first electrode is connected to the drain electrode.

4. The liquid crystal display of claim 3, wherein
   a first branch electrode of the first electrode and a second branch electrode of the second electrode are arranged in alternating manner.

5. The liquid crystal display of claim 4, further including
   an organic layer disposed on the data line, wherein the organic layer has a protrusion at a position corresponding to the data line.

6. The liquid crystal display of claim 5, wherein
   the organic layer includes a color filter layer that includes a first color filter adjacent to a second color filter, and
   the first color filter and the second color filter overlap each other in a region that corresponds to the data line so as to form the protrusion.

7. The liquid crystal display of claim 6, wherein
   the first electrode includes a first connector for connecting the first branch electrode, the third electrode includes a third connector for connecting a third branch electrode, and the first connector and the third connector overlap each other.

8. The liquid crystal display of claim 7, wherein
   the first connector and the third connector contact each other on the protrusion.

9. The liquid crystal display of claim 8, further including
   a light blocking member disposed on the second substrate, wherein the light blocking member is positioned to correspond to the protrusion.

10. The liquid crystal display of claim 9, wherein
    a sum of a height of the light blocking member and a height of the protrusion is greater than or equal to a cell gap of the liquid crystal layer.

11. The liquid crystal display of claim 4, wherein
    the second electrode includes a second connector for connecting the second branch electrode, and the second connector is connected to the storage electrode line.

12. The liquid crystal display of claim 1, wherein
    branch electrodes of the first electrode and the second electrode are positioned symmetrically with respect to branch electrodes of the third electrode.

13. The liquid crystal display of claim 1, wherein
    branch electrodes of the first electrode and the second electrode are positioned in alternating manner with branch electrodes of the third electrode.

14. The liquid crystal display of claim 1, further including
    an insulating layer disposed between the third electrode and the fourth electrode.

15. The liquid crystal display of claim 14, wherein
    an in-plane field is generated between the first electrode and the second electrode when a voltage is applied across the first electrode and the second electrode, and the fringe field is generated between the third electrode and the fourth electrode when a voltage is applied across the third electrode and the fourth electrode.

16. The liquid crystal display of claim 15, wherein
    the fourth electrode is configured to receive a common voltage.

17. The liquid crystal display of claim 16, wherein
    the second electrode is configured to receive a same voltage as that received by the fourth electrode.

18. The liquid crystal display of claim 1, wherein the first electrode contacts the third electrode.

19. The liquid crystal display of claim 1, wherein the liquid crystal molecules have positive dielectric anisotropy.

20. The liquid crystal display of claim 19, wherein the liquid crystal molecules are perpendicularly aligned with either the first substrate or the second substrate while no electric field is applied to the liquid crystal layer.

* * * * *